United States Patent
Lydon et al.

(10) Patent No.: US 6,932,906 B2
(45) Date of Patent: Aug. 23, 2005

(54) FILTER ELEMENT FIXATION FOR FILTER PRESSES

(75) Inventors: Richard Patrick Lydon, Handbridge (GB); James Christopher Edwards, Accrington (GB)

(73) Assignee: Madison Filter Limited, Lancashire (GB)

(*) Notice: Subject to any disclaimer, the term of this patent is extended or adjusted under 35 U.S.C. 154(b) by 246 days.

(21) Appl. No.: 10/031,920

(22) PCT Filed: May 23, 2001

(86) PCT No.: PCT/GB01/02264

§ 371 (c)(1),
(2), (4) Date: May 7, 2002

(87) PCT Pub. No.: WO01/89657

PCT Pub. Date: Nov. 29, 2001

(65) Prior Publication Data

US 2002/0153105 A1 Oct. 24, 2002

(30) Foreign Application Priority Data

May 23, 2000 (GB) .............................................. 0012585

(51) Int. Cl.[7] ................................................. B32B 3/10
(52) U.S. Cl. ..................................... 210/230; 428/66.6
(58) Field of Search ............................... 428/66.4, 66.6; 210/230

(56) References Cited

U.S. PATENT DOCUMENTS 4,765,859 A    8/1988   Heath et al. ............. 156/272.4

FOREIGN PATENT DOCUMENTS

WO    PCT/US99/00668    1/1999

*Primary Examiner*—Alexander S. Thomas
(74) *Attorney, Agent, or Firm*—Quarles & Brady Streich Lang LLP

(57) ABSTRACT

A method of making a filter by bonding two pieces of cloth to the flanges of a barrel-neck connector by locating a ring of bonding agent mixed with a metal powder between each flange and the adjacent surface of each cloth and using induction heating to heat the metal and thus cause the bonding agent to bond the cloth to the flanges. The bonding agent may comprise guide legs which allow its accurate location between the respective cloth and flange and/or the ring may be flexible allowing the ring to be flexed into position over the respective flange of the barrel-neck.

12 Claims, 2 Drawing Sheets

FILTER ELEMENT FIXATION FOR FILTER PRESSES

The present invention relates to filter element fixation for a filter press and has more particular reference to a barrel neck connection for or between spaced filter cloths in producing a filter fabric for a filter press.

It is known to provide as filter presses and some other filter types, filter plates having a slurry feed hole in the filtering area. Both sides of such a filter plate are covered with a layer of filter material and each layer is provided with a feed hole. It is necessary to prevent the slurry from escaping between the filter layers and the filter plate in the region of the feed hole.

In a known arrangement the two layers of filter material are interconnected at the feed hole by a tubular portion made from the filter cloth material which portion is stitched at one end to one layer and at the other end to the other layer to form a so-called "barrel neck" filter cloth. In order to install the assembled cloth on a filter plate it is necessary to fold one entire layer of the cloth and pass it through the feed hole in the filter plate. The stitching operation is particularly time consuming and the stitch holes lead to points of weakness and leakage. Also, the filter cloth becomes hardened during use and it is often impossible to remove the cloth without cutting. Thus removal for washing is prevented and the useful life of the filter cloth is reduced. A further disadvantage is if one side of the cloth becomes damaged, the entire filter cloth must be disregarded.

In order to overcome the problem of stitching a known filter cloth of the "barrel neck" type utilises a hollow plastic cylinder with flanges at either end which in use are respectively secured to the two layers of filter cloth by adhesives or bonding agents. However it is necessary to clamp the parts under pressure during the bonding or whilst the adhesive sets. Also, the problems of fitting and removing the cloth still remain, since it is still necessary to pass one layer of the cloth through the feed hole which entails severe temporary distortion of the flange with possible breakage or permanent distortion thereof.

In order to overcome the aforementioned described problem an arrangement as described in International Patent Application WO 05/07743 was developed, in which the flanged barrel neck connection comprises two separable tubular members that are arranged such that one can be located over the other so as to define a thin walled feed passage. In this arrangement the filter cloths could be attached to respective flanges of the members and the members connected within the feed hole of the filter plate once the cloths were in position. This has the advantage that the cloths can be removed individually when necessary. However, the seal between the two tubular members was insufficient to prevent leakage in a high pressure filter system.

In order to allow the barrel neck connection to be temporarily distorted in order to allow it passage through the feed hole, with the minimum of damage the barrel neck is preferably made of a flexible material, such as a thermoplastic elastomer. The main drawback of constructing the barrel neck of such material is that it can be damaged during heating of the adhesive. In order to alleviate this a method of bonding the flange of a flexible "barrel neck" connectors to a filter cloth was developed (U.S. Pat. No. 4,767,859) in which an annular piece of rigid thermoplastic bonding agent, mixed with a ferrous metal powder was located between the flange and cloth and the metal therein inductively heated in order to melt the adhesive. Pressure is then applied to adhere the flange to the cloth as the adhesive cools. Whilst the transfer of heat to the flange is reduced this method nevertheless has the drawback that the rigid nature of the thermoplastic bonding agent, the bonding agent being made as the same material as the cloth, renders the bonded area relatively inflexible, which causes difficulties when it is necessary to fold the cloth in order to insert it through the feed hole of the filter plate, with the consequence that cracks may form in the fibre of the cloth. Also, it is difficult to locate the bonding agent accurately between the flange and the cloth because the central hole of the rigid annular bonding agents is much wider than the central tube of the barrel neck connector, which means that the bonding agent can be displaced around the central neck. This has the disadvantage that if the bonding agent was not central when induction heated, the adhesive can flow outside the boundaries of the flanges and dry and due to the characteristic rigid nature of the bonding agent, lead to knife-like edges around the periphery of the flange which can lead to a scissor action on the filter cloth causing cuts. Also, sections of the flange may not be bonded to the cloth, resulting in an inadequate seal.

WO 99/37379 (Micronics) describes the attachment of a filter cloth to a rigid or semi rigid barrel neck to form a filter. This barrel neck is not provided with a flange, but has a channel at each end. The cloth is joined to the barrel neck by placing an inflexible bonding agent mixed with metal powder in the channel, covering this with the cloth and then press fitting a press ring into the channel to capture the cloth. The combination is then inductively heated to melt the bonding agent to complete the mechanical joint and to thereby securely fix the cloth to the barrel neck. However, the inflexible nature of the barrel neck and of the bonding agent can lead to the provision of an inflexible bond area resulting to cloth scission caused by excess bonding agent. Furthermore, with only a press-ring, and no application of pressure, there will only be a small amount of surface interlocking between the cloth and the barrel neck, resulting in a relatively weak bond.

It is an object of the present invention to provide a method and apparatus for filter element fixation which overcomes or alleviates the above described drawbacks.

In accordance with one aspect of the present invention there is provided a method of making a filter, including the steps of bonding two pieces of cloth to the flanges of a flanged tube by locating an annular piece comprising a thermoplastic bonding agent mixed with a metal powder between each flange and the adjacent surface of the cloth and using induction heating to heat the metal powder and thus cause the bonding agent to bond the cloth to the flanges, wherein the annular piece has guide means to ensure its accurate location between the respective cloth and flange. This has the advantage that the accurate location of the bonding agent between the flange and cloth ensures that the bonding agent is not melted beyond the periphery of the flange leading to a more satisfactory uniform bond and the reduction of sharp knife-like edges which could lead to cutting of the cloth.

In accordance with a second aspect of the present invention there is provided a filter element fixation apparatus for a method of making a filter including the steps of bonding two pieces of cloth to the flanges of a flanged tube by locating a flexible piece of bonding agent comprising a thermoplastic elastomeric bonding agent mixed with a metal powder between each flange and the adjacent surface of the cloth and using induction heating to heat the metal powder and thus cause the bonding agent to bond to the cloth to the flanges.

The flexible piece of bonding agent, preferably has guide means to ensure its accurate location between the respective cloth and flange.

Preferably the guide means is integrally formed with the annular piece.

The guide means could comprise a plurality of radially extending guide legs which extend from the inner periphery of the annular piece. The guide legs are preferably provided in oppositely disposed pairs. Preferably, the guide means comprises thermoplastic bonding agent.

In a preferred embodiment the annular piece is flexible. This has the advantage that the annular piece can be flexed over the flange during assembly. Furthermore the flexible nature means that the bond formed thereby between the cloth and flange is less rigid thereby reducing the incidence of cracking when flexed. Preferably, the guide means is also flexible. This has the advantage that it can also be flexed into position.

The metal powder in the bonding agent is preferably a fine iron of 5 to 30 m diameter. The metallic powder is distributed in the bonding agent at a ratio of about 1:1 by weight ratio of metal to bonding agent. Preferably, the size distribution of the metallic powder is not greater than 100 mesh (minus 10 to 12%). The distribution of metallic fillings in U.S. Pat. No. 4,765,859 was 100 mesh (±50%). The distribution of the metal powder is significantly narrower when compared to previous applications which has the advantage that the amount of induction heat required can be more easily and accurately calculated leading to a more precise control of the adhesive leading to increased bonding strength between the flange and the cloth.

The annular piece and/or guide legs could comprise the same material as the flange therefore further increasing flexibility.

The filter fixation apparatus may comprise a flanged tube at least the flanges of which are flexible.

The provision of the guide means ensures that the bonding agent can be correctly located before inductive heating takes place, which ensures a more complete seal for the filter element preventing, in use, leakage of filter slurry. Furthermore, there is no excess of bonding agent which can seep out and cause cloth damage. The flexible nature of the bonding agent both before and after heating leads to easier assembly, in that it can be more readily flexed into position, for example over the flange of a barrel neck or fitted to a non flat surface, for example a corner feed filter plate allowing a cloth to be attached to such more securely. In corner feed filter plates, the feed-holes are normally longer and narrower than standard filter plates, which thereby present a further difficulty in feeding one cloth and one flange through to the other side, as per the prior art systems. The fitting is further enhanced when the flanges are also flexible. In addition, corner feed-holes have a small slurry exit point corresponding to 10 to 20% of the total diameter of the flanged tube which is positioned towards the filter-press chamber. This places increased stress on the section of the flanged tube around the slurry exit point, furthermore the narrower corner feed-holes cause the filter slurry to move through the flanged tube with greater velocity, which increases abrasion damage. To counteract said problems, wider flanges may need to be used which prevent damage caused by stress and protect the areas of the cloth around flanged tube exit point from abrasion. The flexible nature of both the boding agent and flange leads to a flexible and thereby more resilient flange cloth bond. Furthermore, even if the bonding agent seeps out the flexible nature of the bonding agent cannot cause cloth scission.

The invention will now be described by way of example and with reference to the accompanying drawings in which.

Figure 1:
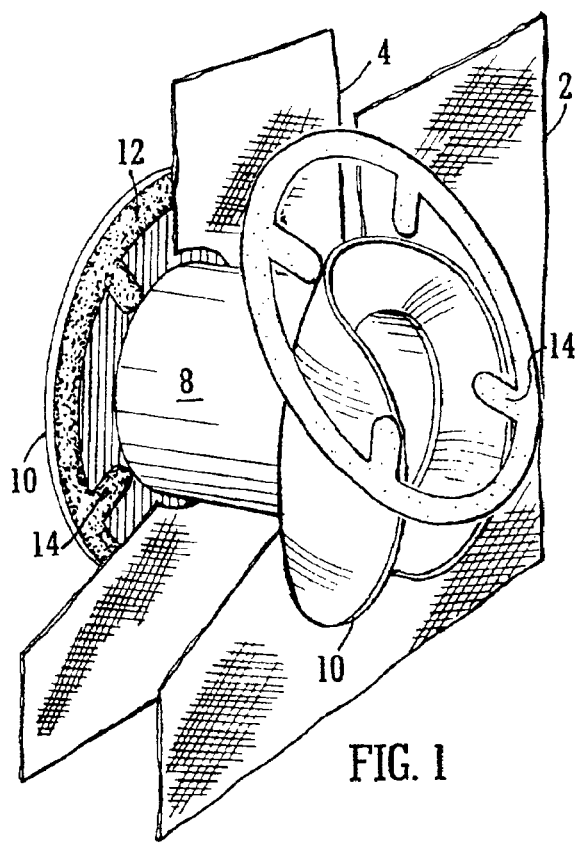
FIG. 1 is a perspective view illustrating filter element fixation in accordance with the invention, for the ease of illustration the filter cloth is shown in partial section.

Referring to the drawings, FIG. 1 illustrates two sheets of filter cloth 2 and 4, a barrel neck connection made from a flexible thermoplastic elastomeric material comprises a tube 8 with radially extending flanges 10 at each end of the tube 8, each flange overlying a corresponding one of the two cloths 2, 4 in the vicinity of the tube 8, and an annular bonding agent 12 between each of the flanges 10 and the adjacent surface of the cloth. It is to be appreciated that FIG. 1 is diagrammatic and shows a relatively small portion of each of the sheets of cloth.

Figure 2:
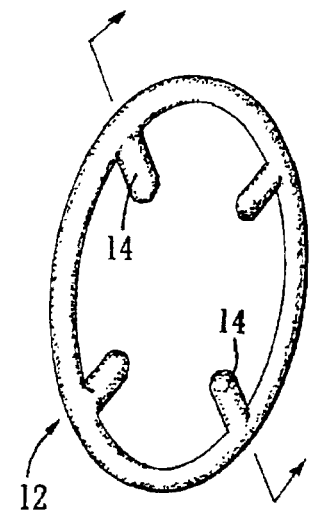
FIG. 2 is a detail of the bonding agent of FIG. 1.
Figure 3:
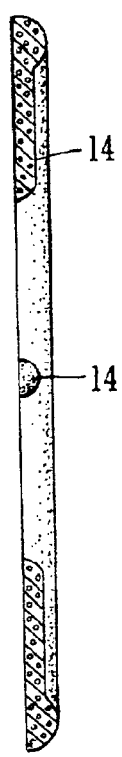
FIG. 3 is a cross-sectional view on line A—A of FIG. 2.

The one piece bonding agent 12 comprises a ring with inwardly extending guide legs 14 (as best illustrated in FIG. 2). The bonding agent 12 is manufactured from a mix of thermoplastic elastomer compound, such as Santoprene (™) or Hytrel (™) and a fine iron powder. The material is mixed for between 1 to 5 minutes in a twin screw mixing unit and the resultant strand is pelletised. The pellets are injection moulded to form said ring with guide legs.

Figure 4:
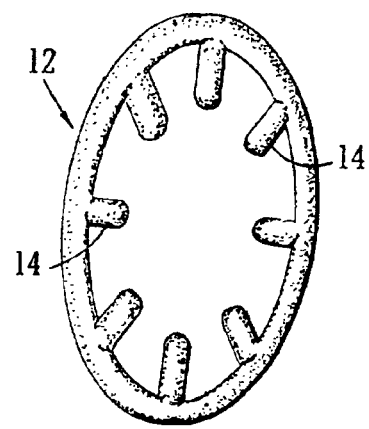
FIG. 4 is a perspective view of a second embodiment of bonding agent.

In FIG. 2 four guide legs 14 are illustrated which centre the bonding agent 12 about the tube 8. The flexible nature of the legs 14 means that they can be flexed over flange 10 during assembly. Although four guide legs have been described alternative arrangements could be used, for example eight guide legs as illustrated in FIG. 4, and the guide legs could be of a variety of shapes.

Figure 5:
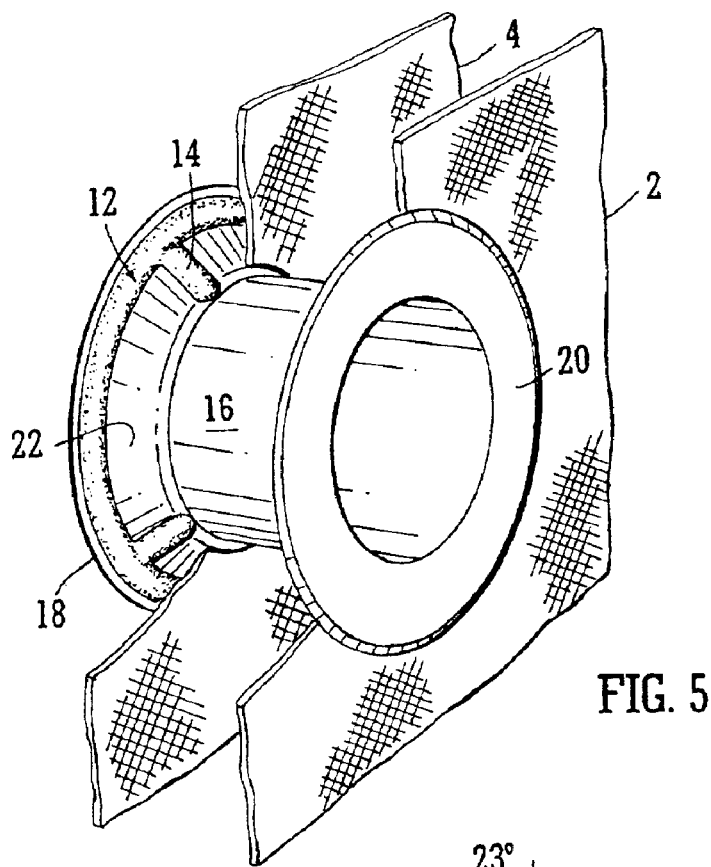
FIG. 5 is a view similar to FIG. 1 illustrating the use of the filter element fixation on a corner feed filter plate.
Figure 6:
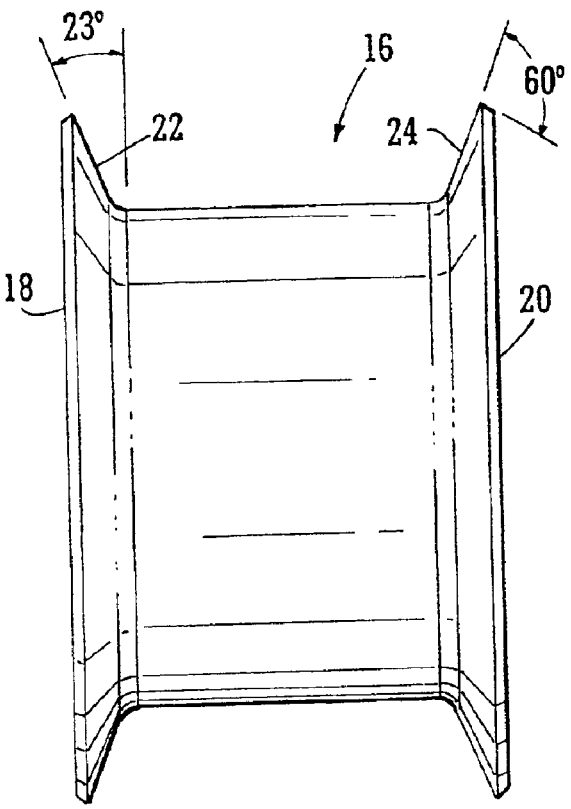
FIG. 6 is a side view of the corner feed filter plate of FIG. 5.

FIGS. 5 and 6 illustrate the use of the bonding agent 12 to locate filter cloths to a corner feed filter plate 16. In this instance the flanges 18 and 20 have a ramped inner surface 22 and 24 respectively, as best illustrated in FIG. 5. The flexible nature of the bonding agent 12 allows the bonding agent 12 to be flexed over the respective flange 18 or 20 the flanges also being flexible, and for it to be placed flatly against said ramped surface 22 and 24.

What is claimed is:

1. A filter element fixation apparatus comprising:
   a flexible piece of thermoplastic elastomeric bonding agent mixed with a metal powder; and
   a flanged tube including two flanges, wherein a piece of cloth is bonded to each of the flanges, wherein said flexible piece is located between each flange and the adjacent surface of each piece of cloth, and wherein the metal powder is heated by induction heating, thereby causing the bonding agent to bond the cloth to the flanges.

2. An apparatus as claimed in claim 1, wherein the flexible piece has guide means to ensure its accurate location between the respective cloth and flange.

3. An apparatus as claimed in claim 1, wherein the flexible piece is annular.

4. An apparatus as claimed in claim 1, wherein the flexible piece has integral guide means to ensure its accurate location between the respective cloth and flange.

5. An apparatus as claimed in claim 1 wherein the flexible piece is annular and has guide means comprising a plurality of radially extending guide legs which extend from the inner periphery of said annular flexible piece.

6. An apparatus as claimed in claim 1, wherein the flexible piece is annular and has guide means comprising a plurality of radially extending guide legs which extend from the inner periphery of said annular flexible piece, and wherein said radially extending guide legs are provided in oppositely disposed pairs.

7. An apparatus as claimed in claim 1, wherein the flexible piece has guide means which comprises thermoplastic bonding agent mixed with a metal powder.

8. An apparatus as claimed in claim 1, wherein the flexible piece comprises flexible guide means.

9. An apparatus as claimed in claim 1 wherein the metal powder in the bonding agent is a fine iron of 5 to 30 m diameter.

10. An apparatus as claimed in claim 1 wherein the metallic powder is distributed in the bonding agent at a ratio of about 1:1 by weight ratio of metal to bonding agent.

11. An apparatus as claimed in claim 1, wherein the size distribution of the metallic powder in the bonding agent is not greater than 100 mesh (minus 10 to 12%).

12. An apparatus as claimed in claim 1, further comprising a flanged tube, the flanges of the tube being flexible.

* * * * *